United States Patent Office 3,843,565
Patented Oct. 22, 1974

3,843,565
EPOXY RESINS CONSISTING ESSENTIALLY OF N,N,N',N'-TETRAGLYCIDYL BISAMINOMETHYL-CYCLO-HEXANE
Yasuo Yamamoto, Kyoto, and Keizo Masawaki, Hiratsuka, Japan, assignors to Mitsubishi Gas-Chemical Company, Inc., Tokyo, Japan
No Drawing. Filed Sept. 25, 1973, Ser. No. 400,681
Claims priority, application Japan, Sept. 28, 1972, 47/96,582
Int. Cl. C08g 30/08, 30/14
U.S. Cl. 260—2 EP
18 Claims

ABSTRACT OF THE DISCLOSURE

An epoxy resin consisting essentially of N,N,N',N'-tetraglycidyl bisaminomethylcyclohexane is obtained by reacting a bisaminomethylcyclohexane with epihalohydrin or β-methylepihalohydrin and then dehydrohalogenating the reaction product with an alkali. The said resin has a Gardner color number of less than 2, a viscosity at 25° C. of 2,000 to 8,000 cps., an epoxy equivalent of 100 to 150, and a halogen content of less than 1.5%.

---

This invention relates to a novel epoxy resin, and to a process for producing the same. More particularly, the invention pertains to an epoxy resin which has a low viscosity and hence is easy to handle and work, is pale-colored, has a high storage stability, and is suitable for casting to give a cured article having a high heat distortion temperature and is excellent in chemical resistance, wheather resistance and tracking resistance.

Heretofore, there have been known many processes for producing epoxy resins having nitrogen atoms in the molecules by reacting amines with epihalohydrins or β-methylepihalohydrins. For example, epoxy resins obtained from aromatic amines such as aniline, diaminodiphenylmethane, phenylenediamine, p-aminophenol and diaminodiphenylsulfone are disclosed in U.S. Pats. 2,921,037, 2,951,822, 2,951,825 and 3,014,895; epoxy resins obtained from aminomethyldiphenyl oxides having aromatic nuclei in the molecules are disclosed in Japanese Patent Publication No. 11,312/70; epoxy compounds having such heterocyclic rings as 6-methyluracyl are disclosed in Japanese Patent Publication 15,624/71; and epoxy compounds prepared from such aliphatic amines as methylamine and butylamine are described in "Journal of Organic Chemistry," Vol. 28, page 2283 (1963).

Among the conventional epoxy resins having nitrogen atoms in the molecules, those obtained from aromatic amines are brown to reddish brown. Moreover, they are so high in viscosity that, at the time of casting or the like, they are difficult to degasify and are quite inconvenient from the standpoint of handling and workability. The epoxy resins obtained from aminomethyl diphenyl oxides having aromatic nuclei in the molecules are pale-colored but have a drawback in that they are somewhat low in storage stability.

As the result of extensive studies on reactions of epihalohydrins or β-methylepihalohydrins with diamines and on epoxy resins synthesized from said compounds, the present inventors have succeeded in producing epoxy resins having characteristics that are not seen in the known epoxy resins obtained from diamines.

An object of the present invention is to provide a novel epoxy resin.

Another object of the invention is to provide a novel epoxy resin which is pale-colored and excellent in storage stability.

A further object of the invention is to provide a novel process for producing said epoxy resin.

Other objects and adavntages of the invention will become apparent from the following description.

In accordance with the present invention, there is provided an epoxy resin consisting essentially of N,N,N',N'-tetraglycidyl bisaminomethylcyclohexane and having a Gardner color number of less than 2, a viscosity at 25° C. of 2,000 to 8,000 cps., an epoxy equivalent of 100 to 150, and a halogen content of less than 1.5%. The epoxy resin of this invention consists essentially of N,N,N',N'-tetraglycidyl bisaminomethylcyclohexane, but it is considered that a part of glycidyl group of said epoxy resin reacts with water to form glycol. The epoxy resin according to the present invention is so high in storage stability that it does not discolor and scarcely varies in viscosity even when allowed to stand at room temperature for 6 months.

Generally, a nitrogen-containing epoxy resin has a tertiary amine in the molecule, and hence ordinarily has a low storage stability. However, the epoxy resin of the present invention which is obtained from bisaminomethylcyclohexane and epihalohydrin or β-methylepihalohydrin is far more excellent in storage stability than the conventional nitrogen-containing epoxy resin, though it also has a tertiary amine in the molecule.

The epoxy resin of the present invention is produced according to a process comprising subjecting bisaminomethylcyclohexane to addition reaction with epihalohydrin or β-methylepihalohydrin to prepare N-halohydrin as an intermediate, and then glycidylating the N-halohydrin by dehydrohalogenation with an alkali.

The bisaminomethylcyclohexane used for producing the epoxy resin of the present invention is 1,3-bisaminomethyl cyclohexane, 1,4-bisaminomethyl cyclohexane, or a mixture thereof. The epihalohydrin or β-methylepihalohydrin used in the present invention is preferably epichlorohydrin, epibromohydrin, β-methylepichlorohydrin or β-methylepibromohydrin. The dehydrohalogenating agent used in the present invention is preferably a strong alkali, in general, and is, for example, anhydrous sodium hydroxide or aqueous sodium hydroxide solution. Alternatively, however, other alkaline reagent, e.g. potassium hydroxide, barium hydroxide, calcium hydroxide, sodium carbonate or potassium carbonate, may also be used.

The epihalohydrin or β-methylepihalohydrin, which is subjected to addition reaction with the bisaminomethyl cyclohexane in producing the epoxy resin of the present invention, is usually used in excess of the bisaminomethyl cyclohexane, and the amount thereof is 3 to 20 moles, preferably 4 to 8 moles, per mole of the bisaminomethyl cyclohexane. If the epihalohydrin or β-methylepihalohydrin is used in an amount smaller than the stoichiometric amount necessary to completely tertiarize the nitrogen atoms of the bisaminomethyl cyclohexane, the resulting epoxy resin undesirably shows an extremely low storage stability.

The addition reaction of bisaminomethyl cyclohexane with epihalohydrin or β-methylepihalohydrin in the present invention is carried out at a temperature in the range of from 10° to 80° C., preferably from 20° to 50° C. The N-halohydrin intermediate, which is formed by the addition of epihalohydrin or β-methylepihalohydrin, is thermally unstable and dimerizes or trimerizes at a temperature above 80° C., so that the resulting final nitrogen-containing epoxy resin becomes high in viscosity. This is undesirable. On the other hand, if the addition reaction is effected at a temperature below 10° C., an extremely long period of reaction time is required, so that the reaction at such a low temperature is not practical and cannot be said to be an economical condition from the industrial standpoint.

The addition reaction of bisaminomethyl cyclohexane with epihalohydrin or β-methylepihalohydrin may be carried out in the absence of solvent, but is preferably conducted in the presence of an aromatic hydrocarbon such as benzene, toluene or xylene, an alcohol such as methanol or ethanol, or a small amount of water, whereby the occurrence of a rapid reaction can be inhibited and the reaction system can be maintained homogeneous.

The present invention, the reaction conditions to be adopted in the step of addition reaction of bisaminomethyl cyclohexane with epihalohydrin or β-methylepihalohydrin may be properly decided depending upon the molar ratio of the reactants charged, the reaction temperature, the presence or absence of solvent and the amount of the solvent. In said reaction, however, it is preferable in view of the properties of the resulting resin that all the nitrogen atoms of the bisaminomethyl cyclohexane are tertiarized. Accordingly, the reaction conditions in the addition reaction step are decided depending upon such factors as mentioned above and cannot be decided simply. Ordinarily, however, the reaction time is from 1 to 8 hours.

After completion of the addition reaction, it is preferable from the economical standpoint to recover the excess of epihalohydrin or β-methylepihalohydrin. The recovery of the excess of epihalohydrin or β-methylepihalohydrin is ordinarily carried out at a temperature in the range of from 20° to 80° C., preferably from 20° to 50° C., under a reduced pressure of less than 10 mm. Hg. The said temperature and pressure are preferable conditions capable of efficiently distilling the excess of epihalohydrin or β-methylepihalohydrin without causing any substantial side reaction of the resulting N-halohydrin intermediate.

The thus obtained N-halohydrin intermediate is ring-closed according to ordinary dehydrohalogenation using an alkali. The dehydrohalogenating agent used in this case may be any of the aforesaid alkalis. In case the dehydrohalogenating agent is such a monovalent alkali hydroxide as sodium hydroxide, the amount thereof is 4 to 8 moles, preferably 4.2 to 6 moles, per mole of the bisaminomethyl cyclohexane, and in case the dehydrohalogenating agent is such a divalent alkali hydroxide as barium hydroxide, the amount thereof is 2 to 4 moles, preferably 2.1 to 3 moles, per mole of the bisaminomethyl cyclohexane. In case the dehydrohalogenating agent is such an alkali carbonate as sodium carbonate, the amount thereof is preferably 1.2 to 1.5 times that of the alkali hydroxide. When the dehydrohalogenating agent is used in somewhat excess of the theoretical amount, the resulting epoxy resin comes to have favorable viscosity, color, and storage stability, and the halogen content of the resin can effectively be made less than 1%.

The dehydrohalogenating agent is used either in the form of a solid, or in the form of an aqueous solution, and the whole amount may be added at one time before initiation of the reaction, or the agent may be added little by little during the reaction. Further, the dehydrohalogenation reaction may be carried out in the presence of an aromatic hydrocarbon such as benzene, toluene or xylene, an alcohol such as methanol, ethanol or propanol, or an ether such as ethyl ether or butyl ether.

The temperature employed in the dehydrohalogenation reaction is in the range of from 10° to 80° C., preferably from 20° to 50° C. The reaction temperature varies depending on the kind and concentration of the alkali in the reaction system, and on the amount of the solvent added such as water, aromatic hydrocarbon, alcohol or ether. However, if the dehydrohalogenation reaction is conducted at a temperature above 80° C., the resulting epoxy resin becomes a colored resin having a high viscosity, while if the reaction is carried out at a temperature below 10° C., the reaction time is made so long that it is disadvantageous in economy.

The completion of the dehydrohalogenation reaction can be confirmed by measuring the amount of the halogen salt formed or the amount of the alkali consumed, or by measuring the amount of water which has been produced as by-product at the same time.

After completion of the addition reaction step and the dehydrohalogenation step, the resulting epoxy resin is taken out of the reaction system either by merely removing the formed halogen salt by filtration and then purifying the filtrate, or by adding to the reaction system an aromatic hydrocarbon such as benzene, toluene or xylene, and then removing the formed halogen salt by water-washing. However, the process, by which the formed halogen salt is removed by water-washing, is more preferable since it can give an epoxy resin higher in storage stability. After removal of the formed halogen salt, a slight excess of alkali is removed by water-washing, and then unreacted epihalohydrin or β-methyl-epihalohydrin and a solvent such as benzene are removed at atmospheric pressure or under a reduced pressure at at temperature below 130° C., preferably below 80° C., usually at a temperature in the range of from 30° to 80° C., whereby the desired epoxy resin is obtained in a high yield.

The thus obtained epoxy resin having nitrogen atoms in the molecule is lower in viscosity than the conventional epoxy resin, and hence can be easily mixed with a curing agent. Moreover, the resin is easily degasified, pale-colored, high in storage stability at room temperature for a long period of time, and thus is preferable as an epoxy resin for casting or the like.

The epoxy resin of the present invention can be cured by use of such curing agents for the conventional epoxy resin as an aliphatic polyamine, e.g. diethylenetriamine or triethylenetetramine; an aromatic diamine, e.g. meta-phenylene diamine or 4,4'-diamino diphenyl methane; an acid anhydride, e.g. phthalic anhydride, methyl nadic anhydride or maleic anhydride; or an amine adduct, to give, despite of its being low in viscosity, a cured article having a high heat distortion temperature and hardness and excellent chemical resistance. The epoxy resin may be incorporated with extenders, reinforcing agents, fillers and pigments which include, for example asphalt, coal tar, bitumen, glass powder, glass fiber, carbon fiber, mica, asbestos powder, quartz powder, kaolin, slate powder, aluminum oxide hydrate, polyethylene powder and iron oxide. Further, at an optional stage prior to curing, the epoxy resin may be incorporated with plasticizers, flow inhibitors, thixotropy-imparting agents, flame retardants and releasing agents.

The epoxy resin of the present invention additionally has such characteristics as being self-curable and, when heated to a temperature above 100° C., can give a tough cured article without the addition of curing agent. This self-curability can further be promoted by incorporation of compounds having hydroxy groups, such as water, an alcohol or the like, or known tertiary amines, or by application of pressure at room temperature. It is also possible to promote the self-curability in an air-free system.

Further, the epoxy resin of the present invention reacts quite easily at such a low temperature as below 100° C. in the absence of catalyst with compounds or resinous materials having carboxyl or phenolic groups, and hence can be used as any of paints, adhesives, caulking materials, injection molding materials and synthetic resin modifying materials.

Furthermore, when the epoxy resin of the present invention is combined with known glycidyl ethers of polyhydric phenol having a 1,2-epoxy equivalency greater than 1, there are provided heat-curable resinous compositions having excellent properties. In this case, it is preferred that 10–900 parts by weight, especially 20–500 parts by weight, of the epoxy resin of the present invention is used per 100 parts by weight of the said glycidyl ethers of polyhydric phenol. As the glycidyl ether of polyhydric phenol, the glycidyl ethers of bisphenol A or novolak-type epoxy resins are used. For instance, when a glycidyl ether of bisphenol A, such as Epikote 828 (Shell Chemical Company), Epikote 834 (Shell Chemical Company, Araldite GY 260 (Ciba Company), DER 331 (Dow Chemical Company), is used as the glycidyl ether of polyhydric phenol, the resulting composition can give a cured product particularly excellent in chemical resistance, hardness, and storage stability and having a high heat distortion temperature. When a commercially available novolak-type epoxy resin, such as DEN 438 (Dow Chemical Company), Epikote 154 (Shell Chemical Company), or Araldite EPN 1138 (Ciba Company), is used as the glycidyl ether of polyhydric phenol, especially good results are obtained. Novolak-type epoxy resins heretofore marketed as heat-resistance epoxy resins give cured products excellent in chemical resistance and dimensional stability and having a high heat distortion temperature, but because of their high viscosity, it is hard to add or mix fillers, curing agents, etc. into said novolak-type epoxy resin. Sometimes, the reactive diluents, such as styrene oxide, butyl glycidyl ether, diglycidyl ether, phenyl glycidyl ether, are utilized to decrease the viscosity of said novolak-type epoxy resin, but in that case, the dimensional stability, chemical resistance or high heat distortion temperature of the cured product are extremely injured. However, when the epoxy resin of the present invention is used in combination with the novolak-type epoxy resin, the viscosity of novolak-type epoxy resin is extremely lowered and the workability of the resulting composition is quite excellent without injuring the aforesaid excellent characteristics of the cured product of the novolak-type epoxy resin.

The present invention is illustrated in detail below with reference to examples. In the examples, the tertiarization of nitrogen atoms was confirmed by acetylation according to conventional procedure, followed by titration with a perchloric acid-acetic acid solution, and the halogen content of each resin was measured according to combustion method.

EXAMPLE 1

A mixture of 213 g. of 1,3-bisaminomethylcyclohexane, 888 g. of epichlorohydrin, 100 g. of benzene and 10 g. of methyl alcohol was fed to a 5-liter reactor equipped with a stirrer, a cooler and a thermometer, and subjected to reaction under stirring at 35° C. for 6 hours. After the completion of reaction, substantially 100% of nitrogen atoms of the 1,3-bisaminomethylcyclohexane had been tertiarized. To this system were then added, without recovering the excess of epichlorohydrin, 768 g. of a 40% aqueous sodium hydroxide solution, 100 g. of benzene and 150 g. of methyl alcohol, and the system was vigorously stirred at 40° C. for 4 hours. Thereafter, sodium chloride formed was dissolved while gradually adding 400 g. of benzene and 2,000 ml. of water to the system, and the oil layer and the water layer were separated from each other. The oil layer was washed several times with hot water at 50° C. and filtered, and then unreacted epichlorohydrin and benzene were removed under a reduced pressure of 5 mm. Hg at 75° C. for 1 hour to obtain 507 g. of a nitrogen-containing epoxy resin. This resin had a viscosity at 25° C. of 4,100 cps., an epoxy equivalent of 108, and a residual chlorine content of 0.87% and exhibited a Gardner color number of less than 1.

100 grams of the thus obtained epoxy resin was mixed with 165 g. of methyl nadic anhydride (hereinafter abbreviated to "MNA"), and the resulting mixture was thermally cured by casting to obtain a cured article. The hardness (Rockwell, M Scale), heat distortion temperature (ASTM D-648) and chemical resistance (test piece 30 x 25 x 4 mm.) of the cured article were as shown in Table 1. For comparison, the physical properties of a cured article obtained from Epikote 828–MNA are also shown in Table 1.

TABLE 1

| | Example 1 | Epikote 828 [1] |
|---|---|---|
| Amount of epoxy resin (g.) | 100 | 100 |
| Amount of curing agent [2] (MNA) (g.) | 165 | 90 |
| Curing conditions | 85° C., 2 hrs.+150° C., 16 hrs. | |
| Hardness (Rockwell M Scale) | 124 | 111 |
| Heat distortion temperature (° C.) | 198 | 138 |
| Chemical resistance (percent): [3] | | |
| Glacial acetic acid | +0.75 | +3.92 |
| Trichlene | −0.16 | Destruction |

[1] 1.5 parts by weight of curing promotor (DMP-30) was added to Epikote 828–MNA. DMP-30=Tris(dimethylaminomethyl)phenol.
[2] Amount of curing agent: Incorporated with 1 gram equivalent of anhydride group per gram equivalent of epoxy group.
[3] "+" and "−" refer, respectively, to an increase and a decrease in weight after treatment at 50° C. for 100 hours.

EXAMPLE 2

A mixture of 213 g. of 1,4-bisaminomethylcyclohexane and 1,110 g. of epichlorohydrin was fed to the same reactor as in Example 1, and subjected to reaction at 45° C. for 4 hours. Thereafter, 315 g. of epichlorohydrin was recovered under a reduced pressure of 8 mm. Hg. at 40° C. in a period of 1 hour, and then 200 g. of toluene was added to the reaction system. Into the system was then dropped with stirring at 40° C. over a period of 1 hour 393 g. of solid potassium hydroxide (purity 90%), and water formed was azeotropically removed out of the system together with the toluene under a reduced pressure of 250 mm. Hg at 70° C. to complete the reaction within about 2.5 hours. After the completion of reaction, the system was cooled to 20° C. and further incorporated with 200 g. of toluene, and potassium chloride formed was removed by filtration. Thereafter, the excess epichlorohydrin and toluene were removed at 80° C. for 2 hours under a reduced pressure of 3 to 4 mm. Hg to obtain 501 g. of a nitrogen-containing epoxy resin. This resin had a viscosity at 25° C. of 6,100 cps., an epoxy equivalent of 115, and a residual chlorine content of 1.1% and its Gardner color number was 1.

100 grams of the thus obtained epoxy resin was incorporated with diethylenetriamine as a curing agent, and then thermally cured under such curing conditions as set forth in Table 2 to obtain a sample. The hardness, heat distortion temperature and chemical resistance of the sample were as shown in Table 2.

TABLE 2

| | Example 2 | Epikote 828 |
|---|---|---|
| Amount of epoxy resin (g.) | 100 | 100 |
| Curing agent | Diethylenetriamine | |
| Amount of curing agent (g.) | 18 | 10 |
| Curing conditions | After allowing to stand at room temperature: +60° C., 2 hrs.; +100° C., 2 hrs.; +140° C., 2 hrs. | |
| Hardness (Rockwell M Scale) | 118 | 107 |
| Heat distortion temperature (° C.) | 152 | 117 |
| Chemical resistance (percent): | | |
| Glacial acetic acid | +0.25 | +4.82 |
| Trichlene | +0.12 | +1.67 |
| 98% sulfuric acid | +0.22 | Elution |

EXAMPLE 3

A mixture of 284 g. of bisaminomethylcyclohexane mixture composed of 30% of 1,4-bisaminomethylcyclohexane and 70% of 1,3-bisaminomethylcyclohexane, and 1,278 g. of β-methylepicholorhydrin was fed to the same reactor as in Example 1, and subjected to reaction at 50° C. for 3 hours (whereby all nitrogen atoms of the starting bisaminomethyl cyclohexane were tertiarized. Subsequently, 380 g. of β-methylepichlorohydrin was recovered under a reduced pressure of 5 mm. Hg. at 45° C. in a period of 1 hour, and then 100 g. of benzene and 60 g. of ethanol were added to the reaction system. To the system was then added at one time 1,600 g. of a 25% aqueous sodium hydroxide solution, and the system was vigorously stirred at 40° C. for 6 hours to complete the dehydrochlorination reaction. Thereafter, 600 g. of benzene and 2.5 kg. of water were added to the system, and the oil layer and the water layer were separated from each other. The oil layer was purified in the same manner as in Example 1 to obtain 692 g. of a nitrogen-containing epoxy resin. This resin had a viscosity at 25° C. of 5,800 cps., an epoxy equivalent of 105, and a residual chlorine content of 1.02% and its Gardner color number was less than 1.

EXAMPLE 4

A mixture of 213 g. of 1,3-bisaminomethylcyclohexane, 1,315 g. of epibromohydrin and 10 g. of ethyl alcohol was fed to the same reactor as in Example 1, and subjected to reaction at 25° C. for 10 hours. Subsequently, the ethyl alcohol and 250 g. of the excess epibromohydrin were recovered under a reduced pressure of 5 mm. Hg at 45° C. in a period of 1 hour, and then 80 g. of ethyl alcohol was added to the reaction system. Into the system was dropped at 35° C. over a period of 1.5 hours 477 g. of sodium carbonate, and the system was subjected to dehydrochlorination reaction for 4 hours. Thereafter, the same purification as in Example 1 was carried out to obtain 496 g. of a nitrogen-containing epoxy resin. This resin had a viscosity at 25° C. of 4,500 cps., an epoxy equivalent of 112, and a residual bromine content of 1.14%, and its Gardner color number was 1.

EXAMPLE 5

A mixture of 284 g. 1,3-bisaminomethylcyclohexane and 740 g. of epichlorohydrin was fed to the same reactor as in Example 1, and subjected to reaction at 55° C. for 2 hours. After the completion of reaction, 100% of nitrogen atoms of the 1,3-bisaminomethylcyclohexane had been tertiarized. Subsequently, 200 g. of benzene and 200 g. of ethyl alcohol were added to the reaction system. To the system was then added at 45° C. over a period of 1 hour 810 g. of a 50% aqueous sodium hydroxide solution. Thereafter, the system was subjected to dehydrochlorination at 50° C. for 3 hours, and the same purification as in Example 1 was carried out to obtain 609 g. of a nitrogen-containing epoxy resin. This resin had a viscosity at 25° C. of 7,050 cps., an epoxy equivalent of 125, and a residual chlorine content of 1.05%, and its Gardner color number was 1.

100 Grams of the thus obtained epoxy resin was incorporated with Epicure-Z as a curing agent, and then thermally cured under such curing conditions as set forth in Table 3 to obtain a sample. The hardness, heat distortion temperature and chemical resistance of the sample were as shown in Table 3. For comparison, the physical properties of a cured article obtained from Epikote 828 are also shown in Table 3.

TABLE 3

|  | Example 5 | Epikote 828 |
|---|---|---|
| Amount of epoxy resin (g.) | 100 | 100 |
| Curing agent, Epicure-Z th[1] (g.) | 34 | 20 |
| Curing conditions | 70° C., 3 hrs.; +170° C., 2 hrs. | +100° C., 2 hrs. |
| Hardness (Rockwell M scale) | 122 | 112 |
| Heat distortion temperature (° C.) | 178 | 149 |
| Chemical resistance (percent): |  |  |
| Glacial acetic acid | +0.14 | +1.46 |
| Trichlene | 0 | +0.61 |

[1] Amine adduct (produced by Shell Chemical Co.).

EXAMPLE 6

Epikote 154 and the epoxy resin obtained in Example 1 are combined and cured with Epicure-Z (curing agent, Shell Chemical Company). The physical properties of the cured product are shown in Table 4. For comparison, the physical properties of a cured product obtained by combining Epikote 154 with a known reactive diluent are shown in Table 4.

TABLE 4

|  | Example 6-1 | Example 6-2 | Example 6-3 | Example 6-4 | Comparative Example 6-1 | Comparative Example 6-2 |
|---|---|---|---|---|---|---|
| Epikote 154 (parts by weight) | 100 | 100 | 100 | 100 | 100 | 100 |
| Epoxy resin of Example 1 (parts by weight) | 0 | 20 | 40 | 100 |  |  |
| Diglycidyl ether (parts by weight) |  |  |  |  | 20 | 40 |
| Viscosity (at 25° C., cps.) | ([1]) | 15,000 | 6,000 | 2,000 | 17,000 | 3,400 |
| Epicure Z | 20 | 27 | 34 | 54 | 31 | 43 |
| Curing condition |  |  | 80° C., 2 hrs +150° C., 16 hrs. |  |  |  |
| Hardness (Rockwell M scale) | 118 | 118 | 118 | 119 | 118 | 118 |
| Heat distortion temperature (° C.) | 176 | 177 | 177 | 177 | 167 | 157 |
| Chemical resistance[2] (percent): |  |  |  |  |  |  |
| 98% H$_2$SO$_4$ | −0.06 | −0.12 | −0.12 | −0.12 | −0.35 | −1.15 |
| Glacial acetic acid | +0.24 | +0.36 | +0.48 | +0.48 | +0.78 | +1.02 |
| Trichlene | +0.12 | −0.06 | −0.06 | −0.06 | +0.31 | +0.72 |

[1] Impossible to measure.
[2] 70° C.×1,000 hrs.

EXAMPLE 7

Epikote 828 (Shell Chemical Company) and the epoxy resin obtained in Example 1 are combined and cured with methyl nadic anhydride (curing agent). The physical properties of the cured product are shown in Table 5. For comparison, the physical properties of a cured product obtained by combining Epikote 828 with the known curing agent are also shown in Table 5.

TABLE 5

|  | Example 7-1 | Example 7-2 | Example 7-3 | Example 7-4 | Example 7-5 | Comparative example |
|---|---|---|---|---|---|---|
| Epikote 828 (parts by weight) | 100 | 100 | 100 | 100 | 100 | 100 |
| Epoxy resin of Example 1 (parts by weight) | 20 | 40 | 100 | 400 | 900 |  |
| DMP-30[1] (parts by weight) |  |  |  |  |  | 1.5 |
| Methyl nadic anhydride (parts by weight) | 122 | 154 | 230 | 710 | 1,530 | 90 |
| Curing condition |  |  | 90° C., 2 hrs.+200° C., 16 hrs. |  |  |  |
| Hardness (Rockwell M scale) | 117 | 118 | 119 | 121 | 123 | 115 |
| Heat distortion temperature (° C.) | 165 | 176 | 185 | 211 | 235 | 149 |
| Chemical resistance[2] (percent) glacial acetic acid | +1.40 | +1.21 | +1.04 | +0.81 | +0.72 | +2.41 |

[1] Cure accelerator, trade name of Shell Chemical Company.
[2] 50° C.×100 hrs.

What is claimed is:

1. An epoxy resin which consists essentially of N,N, N',N' - tetraglycidyl bisaminomethylcyclohexane, and which has a coloration degree of less than 2 in terms of the Gardner color number, a viscosity at 25° C. of 2,000 to 8,000 cps., an epoxy equivalent of 100 to 150, and a halogen content of less than 1.5%.

2. A process for producing an epoxy resin which comprises subjecting bisaminomethylcyclohexane to addition reaction with an excess of epihalohydrin or β-methylepihalohydrin, and then dehydrohalogenating the reaction product by treatment with an alkali.

3. A process according to Claim 2, wherein the bisaminomethylcyclohexane is 1,3-bisaminomethylcyclohexane, 1,4-bisaminomethylcyclohexane, or a mixture thereof.

4. A process according to Claim 2, wherein the epihalohydrin or β-methylepihalohydrin is epichlorohydrin, epibromohydrin, β-methylepichlorohydrin or β-methylepibromohydrin.

5. A process according to Claim 2, wherein the alkali is anhydrous sodium hydroxide, aqueous sodium hydroxide solution, potassium hydroxide, barium hydroxide, calcium hydroxide, sodium carbonate or potassium carbonate.

6. A process according to Claim 2, wherein the epihalohydrin or β-methylepihalohydrin is used in a proportion of 3 to 20 moles per mole of the bisaminomethylcyclohexane.

7. A process according to Claim 6, wherein the addition reaction is effected at a temperature in the range of from 10° to 80° C.

8. A process according to Claim 7, wherein the addition reaction is effected in the presence of a solvent selected from the group consisting of aromatic hydrocarbons, alcohols and water.

9. A process according to Claim 2, wherein the alkali is a monovalent alkali hydroxide and is used in a proportion of 4 to 8 moles per mole of the bisaminomethylcyclohexane.

10. A process according to Claim 2, wherein the dehydrohalogenation is effected at a temperature in the range of from 10° to 80° C.

11. A process according to Claim 2, wherein unreacted epihalohydrin or β-methylepihalohydrin is recovered prior to the dehydrohalogenation.

12. A process according to Claim 11, wherein the recovery is effected under a reduced pressure of less than 10 mm. Hg, at a temperature of 20° to 80° C.

13. A process for producing an epoxy resin having high storage stability which comprises subjecting bisaminomethylcyclohexane to addition reaction with an excess of epihalohydrin or β-methylepihalohydrin, recovering unreacted epihalohydrin or β-methylepihalohydrin, dehydrohalogenating the reaction product by treatment with an alkali, and then adding an aromatic hydrocarbon to the reaction system and removing the formed halogen salt by water washing.

14. A thermosetting resin composition comprising the epoxy resin set forth in Claim 1 and a curing agent.

15. A thermosetting resin composition according to Claim 13, wherein the curing agent is one member selected from the group consisting of aliphatic polyamines, aromatic diamines, acid anhydrides and amine adducts.

16. A thermosetting resin composition comprising 10 to 900 parts by weight of the epoxy resin set forth in Claim 1, 100 parts by weight of a glycidyl ether of a polyhydric phenol having a 1,2-epoxy equivalency greater than 1 and a curing agent.

17. A thermosetting resin composition according to Claim 16, wherein the glycidyl ether of polyhydric phenol is a novolak-type epoxy resin.

18. A thermosetting resin composition according to Claim 16, wherein the glycidyl ether of polyhydric phenol is a glycidyl ether of bisphenol A.

References Cited
UNITED STATES PATENTS

| | | | |
|---|---|---|---|
| 2,951,822 | 9/1960 | Reinking | 260—42 |
| 3,145,207 | 8/1964 | Wohnseidler | 260—249.6 |

WILLIAM H. SHORT, Primary Examiner

E. A. NIELSEN, Assistant Examiner

U.S. Cl. X.R.

260—2 EC, 2 N, 348 R, 830 TW